United States Patent Office 3,528,051
Patented Sept. 8, 1970

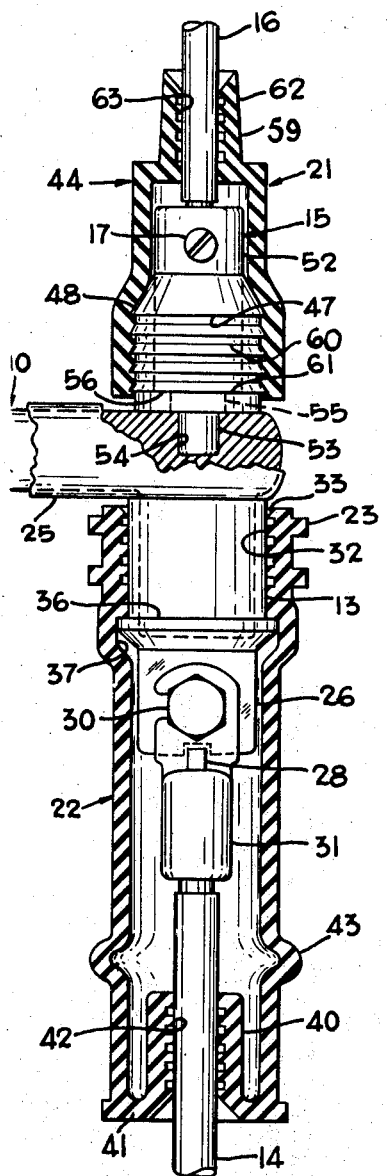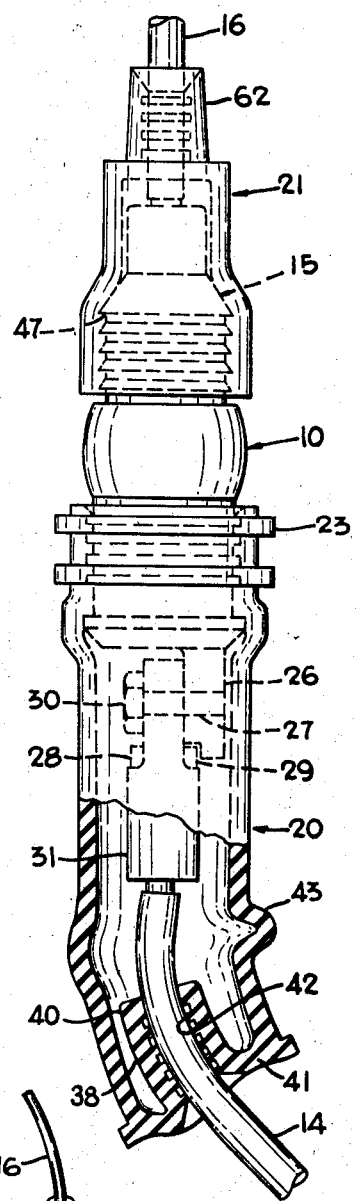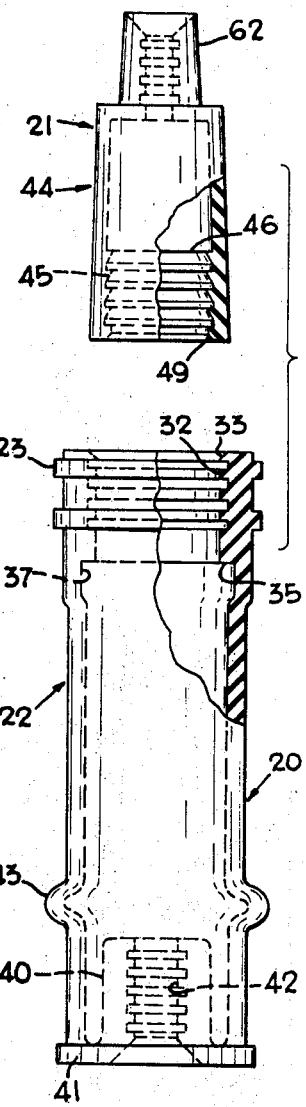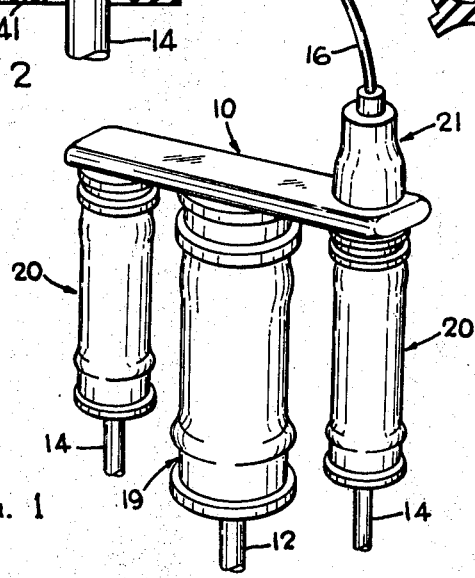

3,528,051
FLEXIBLE INSULATING SHEATH
John A. Toedtman, Warson Woods, and James J. Cooper, Affton, Mo., assignors to International Telephone and Telegraph Corporation, New York, N.Y., a corporation of Delaware
Filed Oct. 30, 1967, Ser. No. 679,120
Int. Cl. H01r 13/56
U.S. Cl. 339—101                                             4 Claims

ABSTRACT OF THE DISCLOSURE

A tubular insulating sheath which is substantially cylindrical to provide a waterproof sleeve for the connection between an electrical conductor and a bus bar. An internal rib and shoulder configuration cooperates with a bus bar terminal to seal one end. At the other end, a reentrant ribbed portion cooperates with the conductor to provide a seal for that end and, in addition, a flexible portion of the sheath is provided which allows the conductor and sheath to be bent without breaking the seal.

BACKGROUND OF THE INVENTION

This invention relates generally to improvement in an insulated cover for electrical conductor connections, and more particularly to a flexible tubular sheath for the protection of underground power distribution lines at their connection points.

Ground water has always been a problem in the successful operation of underground electrical distribution lines because it is imperative that the connection points of such lines be kept in a dry condition. Rubber sheaths have been successful in accomplishing this task to some extent but, the heretofore typical tubular sheath worked well only so long as the sheath remained in parallel alignment with the metal conductor which it protected. Unfortunately, this contingency cannot always be realized.

In many instances, and ofter inadvertently, the conductor was bent within the sheath so that it assumed a curved configuration as it passed through the access aperture at the end of the sheath. The stiffness of the sheath, a concomitant of its heavy duty thickness, inhibited the sheath from conforming lengthwise to the configuration of a bent conductor. Thus, in such a case, the access aperture at the end of the sheath, which normally acted as a seal, was stretched out of shape, because of the uneven pressure exerted by the conductor on the margin of the aperture. A gap was thereby formed between the conductor and that part of the margin diametrically opposite to the pressurized zone, allowing the ingress of moisture. The present invention avoids this situation by stiffening the access portion of the body, and by providing a relatively flexible body portion adjacent to the stiffened access portion.

Another common fault with the heretofore conventional rubber sheaths was that they tended to slip off the terminals. This propensity is avoided in the present invention by providing an annular shoulder in the sheath which is adapted to cooperate with a coacting shoulder on the bus bar terminal. In addition to providing a positive stop means precluding slippage, the seal between the terminal and the sheath is augmented. Heat emitted from the conductor expands the air inside the sheath, and this tends to stretch the sheath, thereby increasing the pressure between the coacting contact shoulders.

SUMMARY OF THE INVENTION

The flexible insulating sheath includes a tubular body adapted at one end to receive a terminal, and at the other end to receive a conductor.

The conductor end of the body includes a stiffened closure means having an access aperture smaller than the conductor to provide a seal with the conductor.

The tubular body includes a circumferentially continuous, relatively flexible portion adjacent to the closure means. The relatively flexible portion is provided by a bellows, a transverse end wall, or by a combination of both. The flexible portion enables the sheath to accommodate itself to a bend in or change in direction of the conductor, yet to retain the waterproof seal.

The stiffened closure means at the conductor end of the body is provided by a reduced portion of the tubular body. The closure means includes a wall having a plurality of interior ribs sealingly engaging the conductor.

A circumferential contact portion at the terminal end of the tubular body interior, of a smaller size than the coacting terminal, provides a pressure contact between coacting parts. The circumferential contact portion at the terminal end of the tubular body includes a continuous contact shoulder. At least one circumferentially continuous, substantially wedge-shaped groove provides the continuous contact shoulder.

The continuous contact shoulder resists longitudinal forces induced into the sheath. Heat emission from the conductor induces longitudinal forces into the sheath, thereby increasing pressure contact at the continuous shoulder, and providing a seal to maintain internal pressure.

BRIEF DESCRIPTION OF THE DRAWING

FIG. 1 is a perspective view illustrating a waterproof connection which includes main and tap conductors and a street lighting adaptor;

FIG. 2 is an enlarged sectional view of a flexible sheath of the type used for both main and tap conductors and of the sheath used for a street lighting adaptor;

FIG. 3 is an enlarged elevational view taken on line 3—3 of FIG. 2, and partially cut way, which indicates the disposition of the sheath to accommodate a bend conductor, and FIG. 4 is an elevational view, partly in cross section, of both types of sheaths before they are fitted.

DESCRIPTION OF THE PREFERRED EMBODIMENTS

Referring now by characters of reference to the drawing, it will be understood that FIG. 1 illustrates the waterproofing of a typical underground connector system which includes a bus bar 10 having a center terminal 11 connected to a main conductor 12, and having flanking outer terminals 13 connected to tap conductors 14. The bus bar 10 also includes a terminal 15 constituting a street lighting adaptor which connects the street lighting conductor 16.

The sheaths 20 and 19 which provide a waterproof cover for the tap and main connections respectively are essentially similar, the principal difference being one of size. In the following discussion references which apply specifically to the sheath 20 which provides waterproofing for a tap connection will be understood to apply also to the sheath 19 which waterproofs the main connection. The sheath 21 which waterproofs the street lighting connection is of a different species and will be described separately.

From FIG. 2 it is seen that the insulation sheath 20 includes a substantially cylindrical, tubular body 22. The tubular body 22 is preferably formed of rubber or other electrically nonconducting elastic material.

At its upper end, the sheath 20 is open and is provided with outwardly facing reinforcing ribs 23 to facilitate the fitting of the sheath 20 tightly yet slidably over the terminal 13 projecting from the bus bar 10. The circumferential ribs 23 assist in the retention of the sleeve 20 on the terminal 13.

The terminal 13 is provided with an enlarged boss 24, which is preferably formed by a concentrated molding of the insulation material forming the insulation cover 25 with which the bus bar 10 and the terminal 13 are provided. It will be observed from FIGS. 2 and 3 that the terminal 13 includes an offset connector tang 26 which projects downwardly below the terminal boss 24. The lug attachment tang 26 includes a threaded hole 27 which receives the fastening bolt 30 selectively connecting the conductor lug 31 to the connector tang lug 26.

The sheath 20 also includes, at its upper end, internal and inwardly facing ribs 32 that are annular in configuration and which act to seal the sheath 20 against the ingress of moisture. In this regard, the internal diameter of the annular ribs 32 is smaller than the body of the terminal 13, thereby providing that a pressure contact will exist between the inside marginal face of the ribs 32 and the terminal 13. The uppermost rib 33 is inwardly tapered to facilitate the fitting of the sheath 20 over the terminal 13, and particularly over the boss 24 of the terminal 13.

FIG. 4 is an illustration of the sheath 20 before it is fitted into place. From the discussion above, it will be clear that the sheath 20 is circumferentially stretched when it is in its final location on the terminal 13, and that the resulting pressure contact between the sheath 20 and the terminal 13 provides a peripheral seal.

The upper portion of the sheath 20 is provided with an internal annular groove 34, the upper face of which provides a flat annular shoulder 35 constituting a circumferential contact portion of the tubular body 22. The terminal boss 24 is likewise provided with an upper annular shoulder 36 with which the tubular body shoulder 35 engages and coacts, thereby providing pressure contact between the terminal 13 and the tubular body 22 when the tubular body 22 is under longitudinal stress in an axial direction tending to separate the body 22 and terminal 13. Such longitudinal stress will be caused by the expansion of the air within the interior of the tubular body 22 because of the emission of heat from the conductor 14 in the vicinity of its electrical connection. The diameter of the sidewall 37 of the groove 34 is preferably smaller than the diameter of the terminal boss 24 to further augment the seal at the terminal end of the sheath 20.

At its lower end, the sheath 20 includes a re-entrant portion 40 having a reduced diameter. The re-entrant portion 40 constitutes a closure means which adjoins a flexible transverse end wall 41 integrally connecting the re-entrant portion 40 to the tubular body 22.

The interior of the re-entrant portion 40 includes a wall 38 providing a plurality of internal, annular ribs 42 constituting diaphragms. The minimum diameter across the ribs 42 is smaller than the diameter of the coacting conductor 14, thereby forming a seal between each rib 42 and the conductor 14. In other words, each diaphragm or rib 42 includes a hole smaller in diameter than the conductor 14. In addition, the relative thickness of the wall 38 provides stiffening for the re-entrant portion 40 which permits the closure means to maintain its relative disposition to the conductor 14, thereby preserving the seal at the conductor end of the sheath 20. It will be understood that internal pressure caused by heat emission also acts on the outer face of the wall 38 to augment the sealing propensity of the diaphragms.

The transverse end wall 41, which adjoins the closure means provided by the re-entrant portion 40, provides a relatively flexible portion of the tubular body 22. The end wall 41 is adjacent to the relatively stiff closure means and provides a bending zone for accommodating a change in attitude, or direction of the conductor 14 and the re-entrant portion 40 while maintaining the seal.

The configuration taken by the sheath 20 when the conductor 14 is bent out of alignment is indicated in FIG. 3. It will be observed that the flexible transverse end wall 41 is susceptible to distortion under the bent condition of the conductor 14. Further accommodating the bending of the conductor 14, the tubular body 22 includes a distended flexible portion which extends peripherally around the tubular body 22 and constitutes a bellows 43.

The sheath 21 which provides the waterproofing between the terminal 15 and the street lighting conductor 16 is representative of another species of the insulating sheath. The sheath 21 includes a tapered tubular body 44. At its terminal end, the tubular body 44 includes a plurality of internal annular grooves 45 which are substantially wedge-shaped in cross-section providing an inclined cam face. Each groove 45 includes an annular, upwardly facing shoulder 46 which cooperates with a compatible, downwardly facing, shoulder 47 provided on the terminal 15. The shoulders 47 are a part of peripheral, upwardly tapered ribs 48.

It will be clear from a comparison between FIG. 2 or 3 and FIG. 4, that the sleeve 21 is stretched on the adaptor terminal 15. In this regard, the outer diameter of each rib 48 is greater than the maximum diameter across its corresponding and compatible, internal, annular groove 45. In this way, the material of the tubular body 44 at the terminal end exerts a pressure on the terminal 15. The inside margin of the terminal end of the tubular body 44 is tapered to form a chamfer 49 which facilitates the placement of the sheath 21 over the terminal 15.

The terminal 15 includes a central cylindrical core 52 and a rubber outer casing 60. The core 52 is reduced twice at the end which is connected to the bus bar 10 as is shown in FIG. 2. The reduction in diameter at the extreme end provides a peg 53 which is received into a socket 54 provided in the bus bar 10. The secondary reduction provides a spacer 55 which in cooperation with the bus bar 10 and the remaining portion of the cylindrical core 52 provides an annular groove 56. In the preferred embodiment, the ribs 48 are formed on outer casing 60. The outer casing 60, of rubber or other resilient material, is molded or otherwise attached to the central cylindrical core 52. The casing 60 is securely held in position by an annular lip 61 which interfits the annular groove 56.

At its conductor end the tubular body 44 is joined to a reduced tubular portion 62 constituting a closure means. The function of this reduced tubular portion 62 is the same as the function of the re-entrant portion 40 of the sheath 20. A wall 59 including a plurality of internal ribs 63 is likewise provided. The wall 59 stiffens the closure means and provides a stiff portion of the sheath 21 adjacent a flexible portion of the tubular body 44 which is formed by a transverse wall 64.

The internal ribs 63 are annular in configuration and each rib constitutes a diaphragm. The internal diameter of the annular ribs 63 is smaller than the diameter of the conductor 16, thus effectively, the diaphragm formed by each rib is provided with a hole smaller than the cross-section of the conductor 16, thereby forming the seal between the sheath 21 and the conductor 16. The rib means provided by internal annular ribs 63 permits the closure means, provided by the redured tubular portion 62, to maintain its relative disposition to the conductor 16, even though the conductor 16 is bent, and thereby preserves the seal at this end of the sheath 21.

Each rib 48 provided on the outer casing 60 of the terminal 15 includes the flat annular contact shoulder 47. The flat contact shoulders 50 cooperate with the annular contact shoulders 46 of the annular grooves 45. Each shoulder 46 coacts with the annular flat shoulder 47 of its associated rib 48 to provide a contact interface resisting longitudinal forces induced in the sheath 21. The maximum diameter across the ribs 48 is preferably greater than the maximum diameter of its associated grooves 45 further to augment the seal at the terminal end of the sheath 21.

It is thought that the functional advantages of this waterproof sheath arrangement have become fully apparent from the foregoing description of parts, but for completeness of disclosure the installation of the sheaths and their operation will be briefly described.

With regard to the secondary conductor 14, it will be observed that the conductor lug 31 is provided with a pair of oppositely placed raised tabs. From FIG. 3, it can be seen that one of these tabs 28 is received within a compatible notch 29 provided on the lug attachment tang 26. This arrangement precludes rotational movement of the conductor lug 31 about the fastener 30 and, consequently, any bending which occurs in the conductor line 14 will tend to occur either outside the sheath 20 or, alternatively, close to the conductor end of the sheath 20 as indicated in FIG. 3.

Once the bolted connection between the conductor 14 and the terminal 13 has been made, it is a simple matter for an operator to push the open end of the sheath 20 over the boss 24 of the terminal 13 until the shoulder 36 of the terminal boss 24 is in a cooperating position with the shoulder 35 provided by the annular groove 34 within the interior of the sheath 20. Engagement of shoulders 35 and 36 prevents the sheath 20 from being inadvertently removed from the terminal 13. Moreover, in addition to providing resistance against forces longitudinal to the sleeve, the watertightness of the sheath as a whole is enhanced, because heat emission from the conductor 14 in the vicinity of the lug connection expands the air within the sheath 20 and, in consequence, tends to stretch the sheath 20 longitudinally, thereby causing pressure to be applied to the interengaging shoulders 35 and 36. Of course this contact pressure between the shoulders 35 and 36 enhances the watertightness.

The effective internal diameter of the sheath, as represented by the inward faces of the ribs 32, is smaller than the diameter of the terminal 13 with which the ribs 32 are in contact. Therefore, circumstantial pressure contact is provided at this location. In a like manner, the internal diameter of the reduced tubular re-entrant portion 40, as represented by the ribs 42, is effectively smaller than the diameter of the conductor 14, and hence peripheral pressure contact is provided at this location between the sheath 20 and the conductor 14.

The relative thickness of the wall 38 also provides stiffening for the re-entrant portion 40 so that in the event the conductor 14 is bent, the re-entrant portion 40 will not release its grip on the conductor 14. The bending is taken up by relatively flexible portions of the tubular body 22 which are provided, in the case of sheath 20, by an annular transverse wall 41 and a bellows 43.

The street lighting conductor 16 is connected to the terminal 15 by means of a set screw 17 threadedly received in the central cylindrical core 52. The sheath 21 is slightly tapered as is shown in FIG. 4 to facilitate its placement over the terminal 15. The provision of the chamfer 49 further facilitates the placement. The annular shoulders 46 of the grooves 45 cooperate with their associated ribs 48. The resistance of the sheath 21 to removal from the terminal 15, upon the application of longitudinal force to the sheath 21, is somewhat analogous to the resistance against movement of an imbedded arrowhead.

The functions of the reduced tubular portion 62, providing a stiffened closure means, and the transverse wall 64, providing a relatively flexible portion, are equivalent to the functions of the re-entrant tubular portion 40 and the flexible transverse wall 41 of the sheath 20 and require, it is believed, no further discussion.

We claim as our invention:

1. In an electrical connection:
   (a) a terminal,
   (b) a conductor connected to the terminal, and
   (c) a tubular insulating sheath of an elastic non-conductive material, the sheath including:
      (1) a tubular body adapted to receive the terminal at one end,
      (2) closure wall means at the other end of the body, stiffening the sheath and including an access aperture receiving the conductor, the closure wall means embracingly engaging the conductor coaxially, and providing a seal with the conductor,
      (3) the tubular body having a peripheral, relatively flexible portion adjacent to the closure wall means to provide a bending zone for accommodating a change in direction of the conductor and the closure wall means, thereby to maintain the seal, and
      (4) sealing means at the terminal end of the body coacting with the terminal, and including a circumferential contact portion of the tubular body having a smaller size than the coacting terminal, thereby providing pressure contact to maintain the seal,
   (d) the terminal including an enlarged end, and
   (e) the circumferential contact portion at the said terminal end of the body including a continuous contact retaining shoulder engaging the enlarged end and resisting longitudinal forces induced into the sheath whereby to retain the sheath on the terminal.

2. In an electrical connection:
   (a) a terminal,
   (b) a conductor connected to the terminal, and
   (c) a tubular insulating sheath of an elastic non-conductive material, the sheath including:
      (1) a tubular body adapted to receive the terminal at one end,
      (2) closure wall means at the other end of the body, stiffening the sheath and including an access aperture receiving the conductor, the closure wall means embracingly engaging the conductor coaxially, and providing a seal with the conductor,
      (3) the tubular body having a peripheral, relatively flexible portion adjacent to the closure wall means to provide a bending zone for accommodating a change in direction of the conductor and the closure wall means, thereby to maintain the seal, and
      (4) sealing means at the terminal end of the body coacting with the terminal, and including a circumferential contact portion of the tubular body having a smaller size than the coacting terminal, thereby providing pressure contact to maintain the seal,
   (d) the relatively flexible portion of the tubular body including a transverse wall providing a flexible diaphragm interconnecting the closure wall means to the tubular body,
   (e) the closure wall means including a plurality of internal ribs providing individual seals with the conductor,
   (f) the closure wall means being re-entrant to the tubular body.

3. In an electrical connection:
   (a) a terminal,
   (b) a conductor connected to the terminal, and
   (c) a tubular insulating sheath of an elastic non-conductive material, the sheath including:
      (1) a tubular body adapted to receive the terminal at one end,
      (2) closure wall means at the other end of the body, stiffening the sheath and including an access aperture receiving the conductor, the closure wall means embracingly engaging the conductor coaxially, and providing a seal with the conductor, (3) the tubular body having a peripheral, relatively flexible portion adjacent to the closure wall means to provide a bending zone for accommodating a change in direction of the conductor and the closure wall means, thereby to maintain the seal, and (4) sealing means at the terminal end of the body coacting with the terminal, and including a circumferential contact portion of the tubular body having a smaller size than the coacting terminal, thereby providing pressure contact to maintain the seal, (d) the relatively flexible portion of the tubular body including a transverse wall providing a flexible diaphragm interconnecting the closure wall means to the tubuar body, (e) the terminal includes an enlarged end, and (f) the circumferential contact portion at the said one end of the body including a continuous terminal retaining shoulder engaging the enlarged end of the terminal to resist longitudinal forces induced into the sheath by internal pressure, and thereby seal the sheath to maintain internal pressure, and (g) an internal peripheral rib being disposed between the contact shoulder and the margin of the terminal end of the tubular body, providing a retaining ring increasing pressure contact between the terminal and the sheath.

4. In an electrical connection:
(a) a terminal,
(b) a conductor connected to the terminal, and
(c) a tubular insulating sheath of an elastic non-conductive material, the sheath including:
   (1) a tubular body adapted to receive the terminal at one end,
   (2) closure wall means at the other end of the body, stiffening the sheath and including an access aperture receiving the conductor, the closure wall means embracingly engaging the conductor coaxially, and providing a seal with the conductor,
   (3) the tubular body having a peripheral, relatively flexible portion adjacent to the closure wall means to provide a bending zone for accommodating a change in direction of the conductor and the closure wall means, thereby to maintain the seal, and
   (4) sealing means at the terminal end of the body coacting with the terminal, and including a circumferential contact portion of the tubular body having a smaller size than the coacting terminal, thereby providing pressure contact to maintain the seal, (d) the terminal including a plurality of annular shoulders, (e) the circumferential contact portion at the terminal end of the tubular body including a plurality of circumferential grooves, each groove being defined by an inclined cam face facilitating the making of the seal and by a contact shoulder portion, each shoulder portion engaging an associated terminal shoulder to resist longitudinal forces induced into the sheath by internal pressure and thereby seal the sheath and maintain internal pressure.

References Cited

UNITED STATES PATENTS

| | | | |
|---|---|---|---|
| 1,971,438 | 8/1934 | Yoder | 285—8 |
| 1,984,347 | 12/1934 | Sutton et al. | 285—8 |
| 2,468,225 | 4/1949 | Murphy | 339—26 |
| 2,665,673 | 1/1954 | Woofter | 339—26 |
| 2,904,769 | 9/1959 | Sampson et al. | 339—26 |
| 3,137,764 | 6/1964 | Gunthel et al. | 339—213 X |

FOREIGN PATENTS 1,007,431  2/1952  France.

RICHARD E. MOORE, Primary Examiner

U.S. Cl. X.R.

339—213